March 13, 1962 D. FRAZIER 3,024,978

ANALOG COMPUTER FOR LINEAR PROGRAMMING

Filed Dec. 17, 1957 2 Sheets-Sheet 1

INVENTOR
DAVID FRAZIER
BY Brumbaugh, Free, Graves & Donohue
HIS ATTORNEYS

INVENTOR
DAVID FRAZIER
BY Brumbaugh
Free, Graves & Donohue
HIS ATTORNEYS

3,024,978
ANALOG COMPUTER FOR LINEAR PROGRAMMING

David Frazier, Hudson, Ohio, assignor to The Standard Oil Company, Cleveland, Ohio, a corporation of Ohio
Filed Dec. 17, 1957, Ser. No. 703,433
9 Claims. (Cl. 235—61)

This invention relates generally to analog computers, and more particularly to analog computers for solving linear programming problems.

By a linear programming problem is meant a problem in which, as mathematically expressed, a number of variable quantities appear in a lesser number of linear simultaneous equations and also in a linear scoring function which may take the form of an equation, the variable quantities being subject to the restriction that they cannot assume negative values. A simple example of such linear programming problem is given by the following expressions:

$$a_{11}x_1+a_{12}x_2+a_{13}x_3+a_{14}x_4+k_1=0 \quad (1)$$
$$a_{21}x_1+a_{22}x_2+a_{23}x_3+a_{24}x_4+k_2=0 \quad (2)$$
$$b_1x_1+b_2x_2+b_3x_3+b_4x_4+z=0 \quad (3)$$

wherein (1) and (2) are simultaneous equations, and (3) is the scoring equation.

In (1), (2) and (3), the factors $x_1$ to $x_4$ represent the variable quantities of the problem. The factors $a_{11}$, etc., are constant value coefficients which multiply the factors $x_1$ to $x_4$ in the simultaneous Equations 1 and 2 to form terms as, say, $a_{11}x_1$, which will be referred to as variable terms. In like manner, the factors $b_1$ to $b_4$ are constant value coefficients which multiply the factors $x_1$ to $x_4$ in the scoring Equation 3 to form terms as, say, $b_1x_1$, which will also be referred to as variable terms. The values represented by the "$a$" and "$b$" coefficients may be either positive or negative, and in Expressions 1, 2 and 3, some of the "$a$" and "$b$" coefficients may be of zero value.

The terms $k_1$ and $k_2$ in Equations 1 and 2 usually represent constants and, hence, will be referred to as constant terms, although such "$k$" terms may be variable in a sense in the specialized instance where the problem involved is the later-described parametric type of linear programming problem. As in the case of the "$a$" and "$b$" coefficients, the "$k$" terms may individually be of positive, negative or zero value. The "$z$" symbol in Expression 3 will be referred to as the scoring term. The value of this "$z$" term is equal to the sum of the values of the variable terms appearing on the left-hand side of the scoring Equation 3.

It will be evident from inspection of simultaneous Equations 1 and 2 that since the number of variable quantities $x_1$ to $x_4$ exceeds the number of simultaneous equations, there is an indefinitely large number of value sets ($x_1$, $x_2$, $x_3$, $x_4$) which are separate solutions to Equations 1 and 2. Nonetheless, the problem represented by Expressions 1, 2 and 3 is not without a particular solution. This is so, since if different value sets ($x_1$, $x_2$, $x_3$, $x_4$) representing solutions of (1) and (2) are substituted into (3), the differing values which are thereby obtained for the scoring term "$z$" will provide a measure of the relative extent to which the individual solutions ($x_1$, $x_2$, $x_3$, $x_4$) satisfy the object of the problem. It follows that the measure afforded by the "$z$" term permits the identification among the many possible solutions of (1) and (2) of a particular solution which is optimal in the sense, say, that the particular solution provides the greatest profit where the object of the problem is, say to maximize profits, or provides the least cost where the object of the problem is to minimize costs.

It also should be evident from inspection of the simultaneous equations, as, say, Equation 1 that, in any given simultaneous equation, the variable quantities $x_1$ to $x_4$ cannot each freely assume any value whatever, but that, on the contrary, a certain relationship is established by each simultaneous equation between the values which are assumable by these quantities. Although within the bounds of this relationship it is possible to have a great deal of variation in the value assumed by any one of the "$x$" quantities, nonetheless the relationship is precise and definitive in the sense that, if all but any given one of the variable quantities is assigned a specified value, then the value of the one left-over variable quantity is rigidly determined by the specified values of the other variable quantities. As an illustration, if Equation 1 involved only the variable quantities $x_1$, $x_2$ and $x_3$, then the relationship enforced by the equation among the three variable quantities would be such that every possible point representing a value set ($x_1$, $x_2$, $x_3$) must lie in one and only one plane extending in that space. Since Equation 1 does, in fact, involve four variable quantities, the relationship impressed by the equation on the four quantities would be represented graphically by a hyperplane in a four-dimensional space having the coordinates $x_1$, $x_2$, $x_3$ and $x_4$.

In recent years there have been developed analog computers of various sorts for simulating linear programming problems in such manner that optimal solutions are obtained for the problems. In such prior art computers, the simultaneous equations and the scoring equation of the linear programming problem are usually represented in the computer by respective channels or sections into which the computer is subdivided. One serious limitation of the mentioned prior art computers has been, however, that, rather than providing means internal to their channels for directly enforcing within those channels the definitive relationships established by the corresponding equation between the variable quantities respectively appearing in the equations, the computers created, or attempted to create these definitive relationships in an indirect manner by means external to the channel as, say, some sort of closed loop arrangements. In general, closed loops and other extra-channel means for establishing the mentioned relationships are disadvantageous in that they add to the cost of the computer, and in that they detract from the accuracy and reliability thereof. As another disadvantage, while some of the mentioned prior art computers have been designed to automatically converge to an optimal solution for the linear programming problem set up thereon, the automatic convergence action of such computers has an undesirable oscillatory character in that the computer, in its successively better approximations to the solution, alternates between approximations which are underapproximations and approximations which are overapproximations insofar as some particular variable quantity of the problem is concerned.

It is accordingly an object of the invention to provide an analog computer for linear programming problems wherein the definitive relationship established by a simultaneous equation of the problem for the variables included in the equation will be enforced internally within the computer channel or section which simulates the equation.

Another object of the invention is to provide an analog computer of the sort described wherein the computer will automatically converge without oscillation to an optimal solution for the linear programming problem set up thereon.

A further object of the invention is to provide an analog computer capable of solving linear programming problems of the parametric type.

A still further object of the invention is to provide an analog computer for linear programming problems which is inexpensive in construction, and which is accurate and reliable in operation.

These and other objects are realized, according to the invention, by providing an analog computer having a plurality of computing sections, a plurality of bidirectionally operable means in each section, a plurality of cross-connecting means, and computer drive means. The mentioned computing sections are respectively adapted to simulate the linear simultaneous equations and the scoring equation by which the linear programming problem is expressed. Within each section, the plurality of bidirectionally operable means disposed therein are each adapted, by changes in a condition common to all of the same, to simulate changes in value of a corresponding variable quantity in the equation simulated by the associated section. Further, within each section, the plurality of bidirectional means disposed therein are mutually interconnected to maintain constant the sum of the condition changes which are respectively undergone thereby. In this manner, there is simulated internally within each section the definitive relationship which exists between the variable quantities of the equation to which the section corresponds.

Each bidirectional means of a section is adapted to transmit a condition change thereof as an output from its section, and, also, as an input to its section. Any one variable quantity of the problem will be simulated in every section of the computer by a respective bidirectional means so that, considering all the sections of the computer, and classifying all the bidirectional means in such sections on the basis of the variable quantity simulated thereby rather than on the basis of the section in which the bidirectional means is found, there will be one set of bidirectional means corresponding to each variable quantity of the problem. The several bidirectional means in each set thereof will, of course, be respectively distributed among the several sections of the computer, and, as stated, the several bidirectional means in any given set thereof will each simulate the same one variable quantity which corresponds to all.

For each set of bidirectional means there is a corresponding cross-connecting means. The bidirectional means in each set thereof are linked together by the associated cross-connecting means to all undergo the same amounts of change in the condition thereof which, as described, is used for simulating purposes. The several cross-connecting means serve, therefore, to enforce on the computer sections the restriction that any one variable quantity of the problem will, as simulated, have the same value in all of the separate computer sections.

The previously-mentioned computer drive means is adapted to undergo freely variable changes in the condition by which the described bidirectional means simulate the variable quantities of the problem. This drive means is in the computer section which simulates the scoring equation, and the drive means is connected therein to transmit its own freely variable changes of condition to the several bidirectional means which are also included within this section. From the bidirectional means of the scoring equation section, the changes of condition induced by the drive means are transmitted through the several cross-connecting means to the bidirectional means of all the other sections of the computer. As later explained, a sufficient variation in condition of the drive means will remove all slack from the system formed of the computer sections, the bidirectional means and the cross-connecting means. When all slack has so been removed, the computer in its operation has reached a point which is indicative of an optimal solution for the linear programming problem set up thereon.

While the present invention will, for convenience, be described herein in terms of a hydraulically operated analog computer, it will be understood that the present invention also comprehends computers employing other than a hydraulic medium, as, say, pneumatic or electronic or electrical or electromechanical computers or mechanical computers. Thus, for example, the invention may be embodied in a mechanical computer of the plate and pulley type, an example of such latter type of computer being disclosed in section 11–7 on pages 242, 243 of the text "High-Speed Computing Devices" authored by the staff of Engineering Research Associates, Inc. and published by the McGraw-Hill Book Company, Inc. in 1950.

For a better understanding of the invention, reference is made to the following description of a representative embodiment thereof, and to the accompanying drawings wherein.

In connection with the figures listed above, it will be understood that any elements which are counterparts of each other are designated by the same primary reference symbol but by different suffixes for this primary reference symbol. Accordingly, it will be understood that, unless the context otherwise requires, any description hereinafter of an element with a given primary reference symbol and suffix is to be considered to apply also to any other element designated by the same primary reference symbol but by a different suffix.

*Apparatus*

Figure 1:
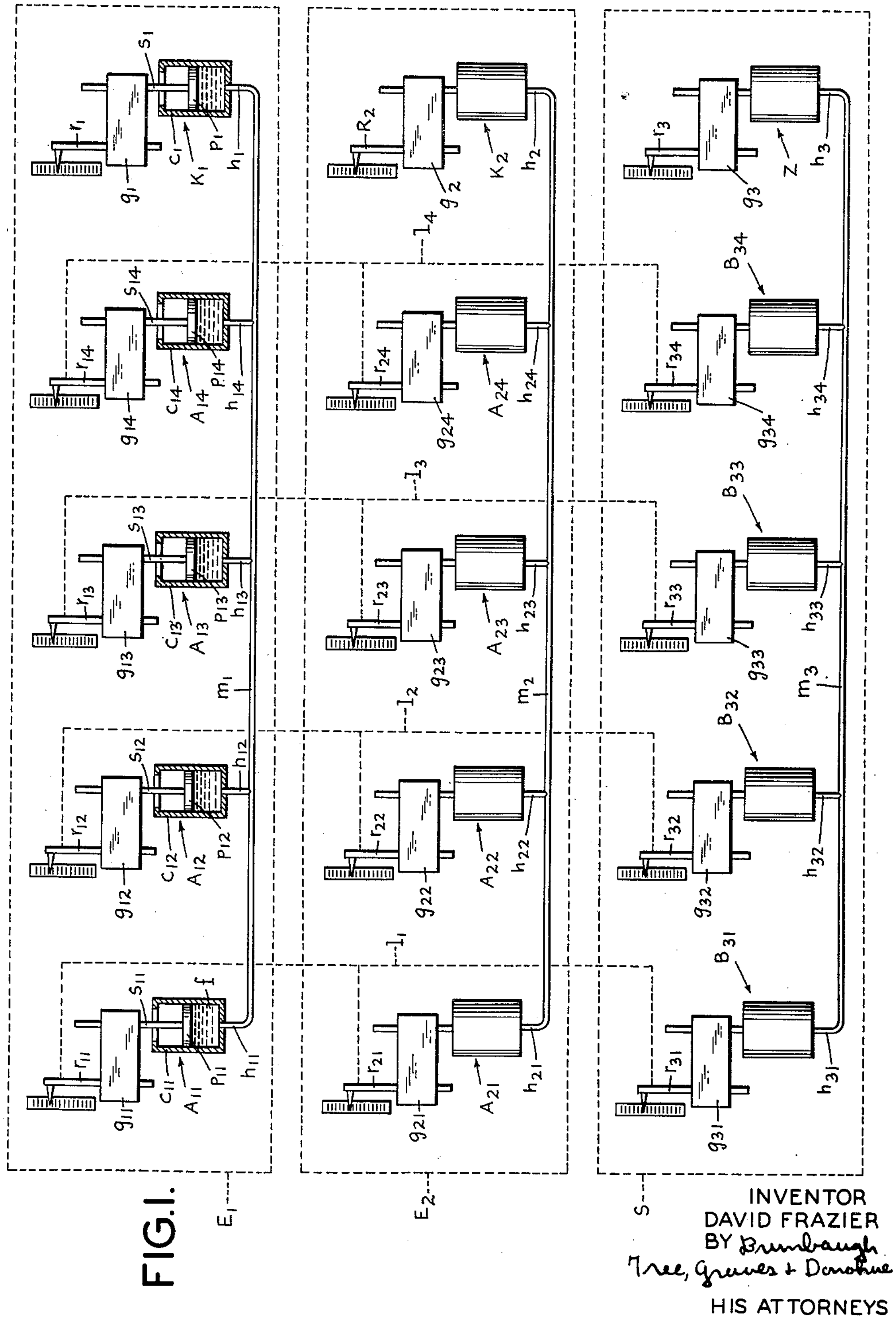
FIG. 1 is a block diagram of an embodiment of computer apparatus in accordance with the invention.

Referring now to FIG. 1, there is shown therein a hydraulic computer adapted to simulate and provide optimal solutions for linear programming problems whose mathematical form is set forth by Expressions 1, 2 and 3. In correspondence with these three expressions, the computer is subdivided into three sections, namely, a pair of section $E_1$ and $E_2$ which respectively simulate simultaneous Equations 1 and 2, and a third section S which simulates the scoring Equation 3. Since many of the components of section $E_1$ are duplicated in sections $E_2$ and S, a detailed description will be given herein only of the first-named section.

Section $E_1$ comprises five cylinder and piston computing units which are designated, respectively, as units $A_{11}$ to $A_{14}$ and as unit $K_1$. The units $A_{11}$ to $A_{14}$ are respectively adapted to simulate the variable terms $a_{11}x_1$ to $a_{14}x_4$ of simultaneous Equation 1, while the unit $K_1$ is adapted to simulate the constant term $k_1$ of this equation.

As shown by FIG. 1, each of the five computing units of section $E_1$ comprises a hydraulic cylinder, a tight-fitting piston in the cylinder, and a motion transmitting stem connected to the piston. For example, the computing unit $A_{11}$ comprises the cylinder $c_{11}$, the piston $p_{11}$ and the stem $s_{11}$. As further shown in FIG. 1, in each computing unit of section $E_1$, the expansible chamber between the cylinder walls and the lower piston face is filled with a volume of incompressible hydraulic fluid $f$. This hydraulic fluid may be transmitted from one to the other of the five computing units of section $E_1$ by hydraulic piping consisting of a main line $m_1$ and of five branch lines $h_{11}$ to $h_{14}$ and $h_1$ which respectively connect the hydraulic fluid chambers defined in the units $A_{11}$ to $A_{14}$ and $K_1$ to the main line $m_1$. The five computing units are interconnected by the hydraulic piping in such manner that, although the amount of fluid $f$ contained in any one unit may change, the total amount of fluid contained by the five units will always remain at a constant value. In other words, the separate volumes of hydraulic fluid contained by the units $A_{11}$ to $A_{14}$ and $K_{10}$ will always add up to a constant despite whatever changes may take place in the respective displacements of the pistons of the various units.

The units $A_{11}$ to $A_{14}$ simulate the variable terms $a_{11}$ to $a_{14}$ associated therewith by means of the condition in displacement of the pistons of the units. For example, a zero value of term $a_{11}x_1$ is simulated by the condition of piston $p_{11}$ when it has zero displacement, i.e., is touching the bottom of cylinder $c_{11}$. By having the bottom position of piston $p_{11}$ simulate zero value of term $a_{11}x_1$, this term, as simulated by the displacement of the piston, is precluded from assuming negative values. Positive values of term $a_{11}x_1$ are simulated by displacements porportional to such values of the piston $p_{11}$ from the bottom of its cylinder.

The value of the constant term $k_1$ of Equation 1 is simulated in somewhat like manner by the displacement of the piston $p_1$ of unit $K_1$, with the difference that, in unit $K_1$, the piston displacement is measured from the top of the cylinder $c_1$. In other words, zero value of term $k_1$ corresponds in unit $K_1$ to the uppermost position which is assumable in this unit by piston $p_1$. Values of $k_1$ greater than zero are simulated in the unit by downward displacements of piston $p_1$ from this uppermost position. As another difference of unit $K_1$ from the units $A_{11}$ to $A_{14}$, in the $K_1$ unit, when $k_1$ is truly of constant value, the piston $p_1$ is locked in position after having been properly adjusted in displacement to represent $k_1$, whereas the pistons are not so locked in the "A" units.

Associated with the computing units $A_{11}$ to $A_{14}$ and $K_1$ of section $E_1$ are a plurality of registering elements $r_{11}$ to $r_{14}$ and $r_1$ which may take the form of rods. The said five registering elements are mechanically coupled, respectively, to the stems of the said five computing units through five bidirectionally operable means which are designated $g_{11}$ to $g_{14}$ and $g_1$. These means may take the form of gear boxes. Each such gear box is adapted to supply motion transmission in either direction, i.e., from the associated registering rod to the piston of the associated computing unit, or, alternatively, from the piston to the rod. Moreover, each such gear box is adapted to provide between the rod and piston coupled thereto a motion transmission ratio of a value which so proportions the displacement positions of the piston to the accompanying translational positions of the rod that the rod positions are simulative of the value of the variable quantity in the variable term simulated by the said displacement positions of the piston. For example, taking the unit $A_{11}$ as typical, in this unit the variable term $a_{11}x_1$ is, as stated, simulated by the amount of displacement of the piston $p_{11}$ from the bottom of the cylinder $c_{11}$. The gear box $g_{11}$ is adapted to extract at any time from the term $a_{11}x_1$, as simulated in this manner, a corresponding simulation of the variable quantity $x_1$ by the position at that time of the registering rod $r_{11}$. This is done by having gear box $g_{11}$ couple the piston and rod by a motion transmission ratio from piston to rod of such value that, in effect, the term $a_{11}x_1$, represented by the piston displacement, is divided by the coefficient $a_{11}$ to thereby render the position of rod $r_{11}$ representative of the variable quantity $x_{11}$. As stated in another way, the motion transmission ratio of gear box $g_{11}$ from piston $p_{11}$ to rod $r_{11}$ is selected in value to, in effect, multiply a change in the displacement of the piston by the factor $1/a_{11}$ to thereby render the concomitant change in position of rod $r_{11}$ simulative of a change in the variable quantity $x_1$ to the same scale as the change in displacement of the piston is simulative of a change in the value of the term $a_{11}x_1$. Conversely, the reciprocal motion transmission ratio of gear box $g_{11}$ (from the rod $r_{11}$ to the piston $p_{11}$) will, in effect, multiply a change in position of rod $r_{11}$ by the factor $a_{11}$ to thereby render the concomitant change in displacement of piston $p_{11}$ simulative of a change in the value of the variable term $a_{11}x_1$ to the same scale as the said change in rod position is simulative of a change in the value of the variable quantity $x_1$.

It will be evident that, from problem to problem, the coefficient $a_{11}$ and the other "$a$" coefficients will be representative of different specific values which, in different instances, may be positive, negative, or zero. It follows, therefore, that the gear boxes of the computer must be capable of providing motion transmission ratios of different value which are either of positive or of negative sign. This may be done in a manner to be later described.

As stated, in the computer as shown in FIG. 1, the $K_1$ computing unit is used to simulate the constant term $k_1$ of Equation 1 and, in consonance with this, the piston $p_1$ is kept locked in a selected position during operation of the computer. The gear box $g_1$ for unit $K_1$ is therefore not ordinarily used during the computer operation. However, when as a preliminary to the computer operation, the piston $p_1$ is being adjusted in displacement, the gear box $g_1$ serves a useful purpose in that it transmits the changes in displacement of the piston to the registering rod $r_1$ to thereby permit the position of this rod to be employed as a measure of the position at that time of the piston. With this measure at hand of the position of piston $p_1$, it is possible to obtain an accurate adjustment of the piston so that the displacement thereof from the top of cylinder $c_1$ is simulative of the term $k_1$ within the tolerances required. In the system of FIG. 1, the gear box $g_1$ does not, like the other gear boxes $g_{11}$ to $g_{14}$, operate to convert a simulation of a variable term into a simulation of a variable quantity. Thus, the gear box $g_1$ may provide any convenient motion transmission ratio between the piston $p_1$ and the rod $r_1$, as say, the ratio 1:1.

The components of section $E_2$ need not be described in detail, since they are essentially similar to the already described components of section $E_1$. It should be evident from the preceding discussion that the computing units $A_{21}$ to $A_{24}$ and $K_2$ of section $E_2$ will simulate the terms $a_{21}x_1$ to $a_{24}x_4$ and $k_2$ of Equation 2 in a manner alike to the simulation of terms $a_{11}x_1$ to $a_{14}x_1$ and $k_1$ by the units $A_{11}$ to $A_{14}$ and $K_1$ in section $E_1$, and that the registering elements $r_{21}$ to $r_{24}$ will simulate the variable quantities $x_1$ to $x_4$ of Equation 2 in a manner alike to that in which variable quantities $x_1$ to $x_4$ of Equation 1 are simulated by the elements $r_{11}$ to $r_{14}$ in section $E_1$.

What has just been said, with regard to the similarity in structure and simulative function of the components of section $E_2$ to the components of section $E_1$, applies, also, to most of the components of the section S which simulate the scoring equation. To enlarge on this, the computing units $B_{31}$ to $B_{34}$ of section S simulate the variable terms $b_1x_1$ to $b_4x_4$ of scoring Equation 3 in the same manner as the four corresponding computing units of section $E_1$ simulate the variable terms associated therewith, and, likewise, the registering elements $r_{31}$ to $r_{34}$ simulate the variable quantities $x_1$ to $x_4$ of Equation 3 in the same manner as the said quantities, when appearing in Equation 1 are simulated by the elements $r_{11}$ to $r_{14}$ in $E_1$. The section S differs, however, from the sections $E_1$ and $E_2$ with respect to the right-hand unit of the section. As stated, in sections $E_1$ and $E_2$, the pistons of the right-hand computing units $K_1$ and $K_2$ are, during operation of the computer, locked in position in order to simulate the constant terms $k_1$ and $k_2$. In section S, however, the right-hand unit Z is not used to simulate a constant term, but, instead, is used to stimulate the variable scoring term "$z$" of the scoring Equation 3. Consonant with this, in the unit Z the piston is not locked in position, but, rather, is freely movable and, in fact, is operably varied throughout a range of movement to thereby drive the entire rest of the computer. The unit Z of section S acts, therefore, as the drive unit for the computer. The manner in which drive unit Z is operated, and the effect of the operation thereof on the whole computer operation, will be later described in further detail.

As further points of interest in connection with the Z unit, the scoring term "$z$" is simulated by the amount of displacement of the piston of this unit from a zero piston position which is at the top of the cylinder. Also, as in the case of the K units, the gear box $g_3$ associated with unit Z is not used to extract a variable quantity from a variable term, but, instead has the principal use of permitting the position of the piston of the Z unit to be indicated by the registering rod $r_3$. Hence, the motion transmission ratio of gear-box $g_3$ may conveniently be 1:1.

The registering elements in sections $E_1$, $E_2$ and S which simulate variable quantities have hitherto been considered on the basis of the particular section in which such registering elements appear. However, the said registering elements can also be grouped together for consideration on the basis of the variable quantity simulated thereby. For example, it will be seen that the elements $r_{11}$, $r_{21}$ and $r_{31}$ all simulate the same variable quantity $x_1$, the elements $r_{12}$, $r_{22}$ and $r_{32}$ all simulate the same variable quantity $x_2$, and so on. There are, therefore, four sets of registering elements which respectively simulate the variable quantities $x_1$ to $x_4$. Associated with these four sets of registering elements are four corresponding linkages $l_1$ to $l_4$ (represented in FIG. 1 by dotted lines). Each such linkage mechanically couples together all the registering elements in the set associated therewith so that every element of the said set will undergo exactly the same amount of movement as every other element in the set, so that every element of the set will, at any one time simulate the same value for the variable quantity represented thereby. For example, the linkage $l_1$ couples together the element $r_{11}$ in section $E_1$, the element $r_{21}$ in section $E_2$ and the element $r_{31}$ in section S so that all three elements move together, and so that, if any one of such elements simulates a given value for the variable quantity $x_1$, the other elements will simulate the same value for this variable quantity. In like manner, the linkages $l_2$, $l_3$ and $l_4$ couple together the sets of registering elements which respectively simulate the quantities $x_2$, $x_3$ and $x_4$, so that, in each case, all the registering elements corresponding to a given variable quantity will simulate the same value for that variable quantity. How this is done will be later described in further detail.

Figure 2:
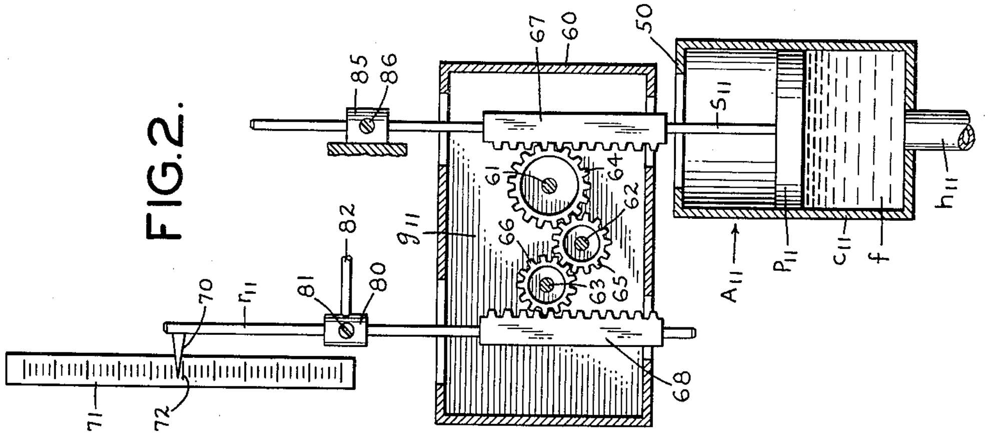
FIG. 2 is a view in vertical cross-section of certain of the components of the block diagram of FIG. 1.

FIG. 2 is specifically illustrative of the details of the computing unit $A_{11}$ and of the components of section $E_1$ which are associated with this computing unit. However, what is shown by FIG. 2 is also generally typical of the other cylinder-piston units and associated components of the FIG. 1 computer.

Referring now to FIG. 2, the cylinder $c_{11}$ of the unit $A_{11}$ is provided at its top with an annular lip 50 extending radially inward to act as an upper limit stop for the piston $p_{11}$. The lip 50 thus serves to define the uppermost position which can be assumed by the piston.

The gear box $g_{11}$ transmits motion between rod $r_{11}$ and piston $p_{11}$ in the following manner. The casing 60 of the gear box houses a plurality of shafts 61, 62, 63. These shafts are adapted to receive interchangeable sets of gears, as, say, the set of gears 64, 65, 66 which is shown in FIG. 2. Of these last-named gears, the gear 64 meshes with a rack 67 mounted on the piston stem $s_{11}$, the gear 66 meshes with a rack 68 mounted on the registering rod $r_{11}$, and the gear 65 is an idler gear which meshes both with the gear 64 and the gear 66. It follows that any motion of piston $p_{11}$ will be transmitted to rod $r_{11}$, and, conversely, that any motion of rod $r_{11}$, and, conversely, that any motion of rod $r_{11}$ will be transmitted to piston $p_{11}$.

The set of gears 64, 65, 66 is adapted to provide, between the rod and the piston, a value of motion transmission ratio which is characteristic of this gear set. If a different value of motion transmission ratio is desired, the shown gear set may be replaced by another gear set whose gears have different relative diameters than those shown in the figure. The gear diameters of the new gear set are chosen to provide the new value of motion transmission ratio which is wanted.

By tracing out the relative directions of translational motion of the racks 67, 68 and of rotation of the gears 64, 65, 66, it will be discovered that the shown gear set couples the racks together in such manner that an upward motion of rack 67 results in a downward motion of rack 68, and, conversely. The convention which will be used herein is that a gear set resulting in opposite directions of motion of the racks is simulative of a negative value for an "*a*" or "*b*" coefficient. This simulation of a negative value coefficient is characteristic of gear sets having three gears as shown in FIG. 2. The simulation of a positive "*a*" or "*b*" coefficient can be obtained by using a gear set causing the racks 67 and 68 to move in the same direction. Such positive simulating gear set may consist of a gear mounted on the shaft 61 and a gear mounted on shaft 63 with no gear being mounted on shaft 62, but with the two gears of the set being of proper diameter to mesh together as well as with, respectively, the racks 67 and 68.

The various positions assumed, during operation, by the registering rod $r_{11}$ may be determined from a pointer 70 on the rod and from a calibrated scale 71 disposed beneath the pointer. As shown, the scale 71 is divided into indicia which are spaced apart a proper amount to represent the values of the variable quantity simulated by the positions of rod $r_{11}$. The middle indicium 72 on the scale may be chosen to represent zero value for the variable quantity. If the middle indicium represents zero value, then positive and negative values for the variable quantity will be respectively represented by indicia which lie above and below the middle indicium.

As stated, the rod $r_{11}$ is adapted to be coupled to the rods $r_{21}$ and $r_{31}$ (FIG. 2) by the linkage $l_1$. The components of this linkage which are shown in FIG. 2 consist of a sleeve 80 which, when unlocked, is adapted to slide along the rod $r_{11}$, a set screw 81 adapted to lock the sleeve in position on the rod, and a coupling bar 82 which is fixedly attached to the sleeve. The coupling bar 82 forms a part of linkage $l_1$, and is adapted through the remainder of this linkage to link sleeve 80 to the corresponding sleeves on rods $r_{21}$ and $r_{31}$ in such manner that all three sleeves will be caused to move by the same amount. With the sleeves associated with rods $r_{11}$, $r_{21}$ and $r_{31}$ being so linked, the rods themselves, when the sleeves are locked thereon, will also be coupled in motion so that the movement of any one rod will be duplicated by exactly the same amount of movement of the other two rods.

The sleeve 80 on rod $r_{11}$ is matched by a sleeve 85 which encircles the stem $s_{11}$ of the piston $p_{11}$. The sleeve 85 is attached to a foundation support (not shown) and, hence, is fixed in position. However, the stem $s_{11}$ is slidable through the sleeve and is, therefore, movable so long as the sleeve is not locked thereto. The movement of stem $s_{11}$ may be arrested by turning a set screw 86 which is carried by sleeve 85, and which locks the sleeve and stem together when given a sufficient inward advancement.

The sleeve 85 is not ordinarily used to lock in position the stem encircled thereby (and the piston connected to the stem) in the instance where the stem is a component of one of the already-described A or B computing units. However, the said sleeve may be used for position locking purposes with an A or a B unit where the nature of the linear programming problem to be set up on the computer is such that there is no variable term corresponding to that particular unit. In such case, the sleeve 85 and the stem $s_{11}$ are locked together by set screw 86 in in an appropriate relative position to hold the piston $p_{11}$ at the "zero" (bottom) position thereof in its cylinder.

The sleeve 85 is used in a K computing unit in the ordinary instance where this unit is required to simulate a term "*k*" of constant value. In such instance, the piston is adjusted to the downward displacement from the top of the cylinder which simulates the value of the "*k*" term, and the sleeve 85 and stem of the piston are then locked together. If the unit is a K computing unit, the sleeve 80 and coupling bar 82 are ordinarily not present.

Neither the sleeve 80 nor the sleeve 85 is used in the operation of the Z drive unit.

*Setting up and Operation of the FIG. 1 Computer*

In order to solve a given linear programming problem on the computer shown in FIG. 1, the computer is preliminarily set up as follows. As a first step, the amount of hydraulic fluid in the sections $E_1$, $E_2$ and S is adjusted to bring the pistons of the K units and of the Z unit to their zero positions at the tops of their cylinders when the pistons of the A and B units are all at zero position at the bottoms of their cylinders. At this time, all the pistons in the computer are free to move, and none of the registering rods of the computer are coupled together through the linkages $l_1$ to $l_4$. When all pistons are in zero position, gear sets giving the proper motion transmission ratios to simulate the "$a$" and "$b$" coefficients of the problem are placed in the gear boxes associated with the A and B computing units.

As a second step, the pistons of the K units are set and locked to the position where these units will properly simulate the constant value "$k$" terms of the simultaneous equations of the problem. By such adjustment of the K units, each E section is individually rendered simulative of the simultaneous equation corresponding thereto. Thus, considering section $E_1$ and its corresponding simultaneous Equation 1, when unit $K_1$ is adjusted to simulate the constant value term $k_1$, the units $A_{11}$ to $A_{14}$ are thereby necessarily rendered simulative of the variable terms $a_{11}x_1$ to $a_{14}x_4$ for Equation 1, and the registering rods $r_{11}$ to $r_{14}$ are correspondingly rendered simulative of the variable quantities $x_1$ to $x_4$ as they appear in this equation. The mode of simulation so established in section $E_1$ permits the values of any number less than four of the simulated quantities $x_1$ to $x_4$ to be freely changed by manipulating an appropriate one or ones (less than four) of the rods $r_{11}$ to $r_{14}$. However, because of the incompressible nature of the hydraulic fluid in section through the hydraulic piping thereof, any free change of the "$x$" quantity or quantities as simulated by one or ones (less than four) of the A units will be compensated for by a responsive change or changes in the "$x$" quantity or quantities simulated by the remaining one or ones of the A units. This responsive change or these responsive changes will be of such amount that there will always be satisfaction of the relationship established by Equation 1 between all the "$x$" quantities of the problem appearing in this equation.

Although each E section of the computer has now been rendered individually simulative of the simultaneous equation corresponding thereto, nonetheless there is not yet any correlation between the simulations of the "$x$" quantities which are provided by the different computer sections. For example, after the adjustment of the K units in the E sections has been completed, it is most likely that the rods $r_{11}$, $r_{21}$, and $r_{31}$ in sections $E_1$, $E_2$ and S will simulate entirely different values for the variable quantity $x_1$. It is therefore necessary, as a third step, to cross-connect the computer sections so that each variable quantity will, as simulated, have the same value in all the sections. This may be done by coupling together the rods $r_{11}$, $r_{21}$ and $r_{31}$ through the linkage $l_1$, by then coupling together the rods $r_{12}$, $r_{22}$ and $r_{32}$ through the linkage $l_2$, and so on. The first-named set of rods are coupled together by adjusting all the rods in the set to the same position, and by then locking the respective sleeves 80 on the rods (FIG. 2) against sliding motion thereon, so that all the rods will be fixedly linked together through the linkage $l_1$. The rods in each other set thereof are caused to be linked together in the same fashion. As a matter of convenience, the common position to which the rods in a set are brought before being mutually coupled may be that position which, for each rod, corresponds to "zero" value as indicated by the associated scale.

As the cross-connection of the computer sections progresses by the successive couplings of the sections through the linkages $l_1$ to $l_4$, more and more slack will be removed from the computer system. Nonetheless, even after completion of the last coupling, a certain amount of slack will remain. At this time, the successive cross-connections of the computer sections will have caused in the Z unit the piston thereof (which simulates the scoring term) to assume some definite displacement position. This position simulates the value for the scoring term corresponding to the value set ($x_1$, $x_2$, $x_3$, $x_4$) which is, at this time, simulated by the registering rods as a random solution to the linear programming problem which has been set up on the computer.

The described steps serve to fully set up the computer for operation. The computer operation is, in itself, a very simple procedure, and consists merely of varying the piston of the Z drive unit in a selected direction until the piston can move no further. Assume that this selected direction is downward. As the piston of the Z unit is progressively forced down (by, say, manipulation of rod $r_3$), it will be found that the slack in the computer system will get less and less until the slack disappears entirely. When this state of no available slack has been reached, neither the Z piston nor any of the registering rods can be moved any further. It follows that the Z piston has, at this limiting downward position, found the maximal value which can be assumed by the scoring term "$z$" of the problem set up on the computer, and that, accordingly, the values of the "$x$" quantities then simulated by the registering rods must represent the value set ($x_1$, $x_2$, $x_3$, $x_4$) which represents a maximal optimum solution to the problem. A maximal optimum solution corresponds to the limiting downward displacement of the Z piston for the reason that the value of the "$z$" scoring term simulated by this piston is equal to the displacement of the piston from the top rather than from the bottom of the cylinder.

If the problem requires a minimum optimal solution, this latter solution can be obtained by forcing the Z piston upward until a limiting uppermost position is reached. Again, as the Z piston is moved upwardly, more and more slack will be removed from the computer system until the slack disappears entirely. The minimum optimal solution will be indicated by the values of the "$x$" quantities which, at that time, are respectively simulated by the registering rods of the computer.

As a practical example of the above, assume that the linear programming problem to be solved is of the form:

$$2x_1-x_2+6x_3-x_4-7=0 \qquad (4)$$

$$5x_1-3x_2+x_3-2x_4-2=0 \qquad (5)$$

$$4x_1+x_2+2x_3+x_4+Z=0 \qquad (6)$$

This problem may be set up on the computer in the manner described. If the computer is then operated to find optimal solutions for the problem, results will be obtained as indicated by the following table.

| | Maximal Solution | Minimal Solution |
|---|---|---|
| $x_1$ | 19 | 0.179 |
| $x_2$ | 31 | 0.000 |
| $x_3$ | 0 | 1.104 |
| $x_4$ | 0 | 0.000 |
| Z | 107 | 1.28 |

*Modifications of the FIG. 1 Computer*

Figure 3:
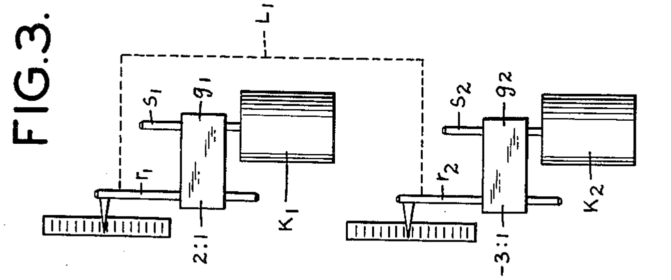

It has been assumed hitherto, in the discussion of the FIG. 1 computer, that the "$k$" terms in Equations 1 and 2 were factors of constant value, and that, accordingly, the pistons of the K units in sections $E_1$ and $E_2$ would be locked in position to simulate these constant value terms. In the parametric type of linear programming problem, however, the "$k$" terms can be relatively variable. As an example of what is meant, suppose that the above-listed Equations 4, 5 and 6 relate to the problem of blending petroleum refinery products to form gasoline conforming at minimum cost to standardized specifications, and that the right hand factors 7 and 2 in (4) and (5) are representative of the amounts of two intermediate petroleum refinery products which enter into the gasoline blending. Suppose, moreover, that either intermediate product can be used for blending purposes in any amount desired and that one can be substituted for the other at a rate of two of the first for three of the second. In other words, the supposition is that, at the refinery, by reducing the production of the intermediate product of Equation 4 from 7 to 5 it is possible to increase the intermediate product of Equation 5 from 2 to 5. The relative exchangeability of these two intermediate products can be simulated in the FIG. 1 computer in the manner shown by FIG. 3 wherein the gear box $g_1$ provides a motion transmission ratio of 2:1 from rod $r_1$ to stem $s_1$ of unit $K_1$, the gear box $g_2$ provides a $-3:1$ motion transmission ratio from rod $r_2$ to stem $s_2$ of the unit $K_2$, and wherein the rods $r_1$ and $r_2$ are coupled together by the linkage $L_1$ in the same manner as the rods of the A and B units are coupled together by the linkages $l_1$ to $l_4$. The position of the linkage $L_1$ will correspond to the value of the parameter which permits substitution, one for the other, of the two intermediate products. The problem is solved by obtaining an optimal solution in the manner previously described while the linkage $L_1$ is held at one setting. The linkage $L_1$ is then varied in its setting of position while there is noted, at the same time, the variation in value of the optimal solution represented by the Z unit. The position variation of $L_1$ is continued until the best value for the optimal solution has been determined. In this way, there can be attained an optimal solution for the problem at the optimum value of the parameter.

In certain instances, the relative exchangeability, one for another, of the two discussed intermediate products may be a function of two parameters. This latter situation may be simulated on the FIG. 1 computer by the system shown in FIG. 4.

In this system the gear units $dg_1$ and $dg_2$ respectively associated with the computing units $K_1$ and $K_2$ are differential gear units. A linkage $L_2$, whose position simulates the first parameter, is connected through a gear box 80 to the differential unit $dg_1$ and through a gear box 81 to the differential unit $dg_2$. Another linkage $L_3$, whose position simulates the second parameter, is connected through a gear box 82 to the differential unit $dg_1$, and through a gear box 83 to the differential unit $dg_2$. The gear boxes 80 and 81 are adapted to simulate the degree to which the intermediate products represented by $K_1$ and $K_2$ will be substituted one for another as a result of variation in the first parameter, while the gear boxes 82, 83 simulate the degree to which the two intermediate products will be substituted one for another as a result of variation of the second parameter. The rod $r_1$ and the stem $s_1$ are non-differentially coupled in 1:1 ratio through gear unit $dg_1$, while the rod $r_2$ and the stem $s_2$ are, likewise, non-differentially coupled in 1:1 ratio through gear unit $dg_2$. Because of the characteristic operation of differential unit $dg_1$, the rod $r_1$ and the stem $s_1$ will each move (by the same amount) in proportion to the difference between the two motion inputs which are transmitted to gear unit $dg_1$ from gear boxes 80, 82, and which are initiated by variations in the position settings of linkages $L_2$ and $L_3$. Similarly, because of the characteristic operation of differential unit $dg_2$, the rod $r_2$ and stem $s_2$ will each move (by the same amount) in proportion to the difference between the two inputs of motion which are transmitted to the unit $dg_2$ from gear boxes 81, 83, and which are initiated by variations in the position settings of linkages $L_2$ and $L_3$.

Figure 4:
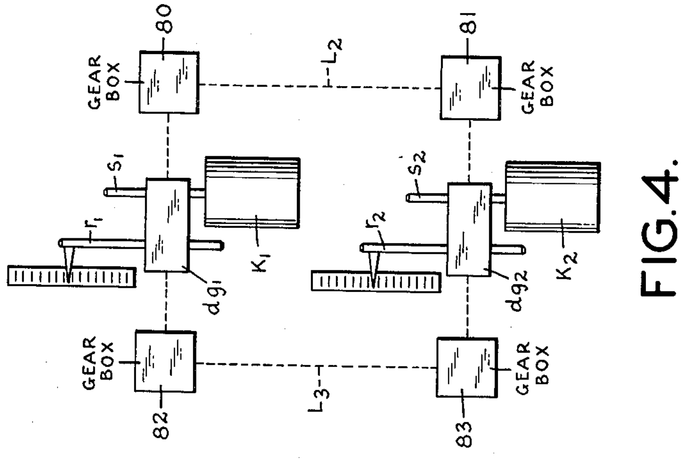
FIGS. 3 and 4 are views in block diagram of modifications of the embodiment shown in FIG. 1.

In the operation of the FIG. 1 computer when provided with the FIG. 4 modification, an optimal solution is first registered on the Z unit with the linkages $L_2$ and $L_3$ being held to selected settings of position. The said linkages are then simultaneously or sequentially varied in position until there is found that position permutation of the two linkages which gives the best optimal solution to the problem.

The above-described embodiments and modifications being exemplary only, it will be understood that the invention herein comprehends embodiments differing in form or in detail from the described embodiment and modifications thereof. For example, it will be understood that the number of E computer sections and of computing units in such sections can be increased as desired to accommodate linear programming problems of greater complexity than the exemplary problems which are considered herein. Accordingly, the invention is not to be interpreted as limited, save as is consonant with the scope of the following claims.

I claim:

1. A computer for linear programming problems wherein a number of variable quantities appear in a lesser number of simultaneous equations and also in a scoring equation, said computer comprising, a plurality of computing sections respectively adapted to simulate said equations, a respective plurality in each section of bidirectionally operable means of which each is adapted by changes in a condition respective thereto, and the same in character as the respective conditions of each of the others in said plurality of sections, of said bidirectionally operable means to simulate changes in value of a corresponding variable quantity in the equation simulated by the associated section, the said plurality of bidirectional means in each section being interconnected through such section to interact each on the others to maintain constant the sum of the condition changes separately undergone thereby, and each bidirectional means of a section being bidirectional in the sense of being adapted to transmit a condition change thereof as an output from the section and also as an input to said section, a plurality of cross-connecting means each coupled to a set of bidirectional means which respectively simulate the same one variable quantity in different ones of the said sections, each such set of bidirectional means being linked together by the associated cross-connecting means to undergo the same amount of change of said condition, and a computer drive means adapted to undergo unconstrainedly variable changes in said condition, said drive means having a connection to said section simulating the scoring equation to transmit by said connection said unconstrainedly variable changes to the bidirectional means of said last-named section, and thereby, through said plurality of cross-connecting means, to the bidirectional means of all said sections, said drive means by sufficient variation thereof in said condition being adapted to remove all slack from the system formed of said sections, bidirectional means and cross-connecting means, and to thereby determine by said system an optimal solution for said linear programming problem.

2. A computer for linear programming problems wherein a number of variable quantities appear in respective variable terms of each of a lesser number of simultaneous equations which each also have a constant term, and wherein said variable quantities also appear in respective variable terms of a scoring equation which expresses by a scoring term the sum of the last-named variable terms, said computer comprising, a plurality of computing sections E, respectively representing said simultaneous equations, and an additional computing section S representing said scoring equation, a plurality of computing elments A respectively representing in each E section the variable terms of the equation thereof, and a plurality of computing elements B respectively representing in said S section the variable terms of said scoring equation, each of said A and B elements being adapted by a change in a condition characterizing all said elements to simulate a change in the value of the variable term represented thereby, in each E section a computing element K adjustable in said condition and adapted by adjustment thereof to a selected condition value to simulate the value of the constant term of the corresponding equation, in said S section a computing element Z adapted to undergo freely variable changes in said condition and to simulate thereby changes in the value of said scoring term, means in each E section interconnecting the A and K elements thereof to render the same mutually communicative of respective changes thereof in said condition, and to maintain constant the sum of such changes in that section, means interconnecting in like manner the B and Z elements of said S section, in said E sections and S section a plurality of registering elements respectively corresponding to said A and B computing elements and each adapted to be changeable in said condition, a bidirectionally operable proportioning means connected between each registering element and the associated computing element to translate a change in said condition of one thereof to a change in said condition of the other thereof in a fixed ratio which, from the latter to the former element, is equal to the ratio of the value of the variable term simulated by the latter element to the value of the variable quantity included within such term, said registering elements being accordingly adapted by their changes in said condition to simulate the respective changes in value assumable by corresponding variable quantities in the variable terms of said equations and of said function, a plurality of cross-connecting means each coupled to that set of registering elements which respectively simulate the same one variable quantity in different ones of said E sections and S section, each such set of registering elements being linked together by the associated cross-connecting means to undergo the same amount of change in said condition, and drive means to produce the said freely variable changes in the value assumed for said condition by said Z computing element, said drive means by producing a sufficient condition change in said Z element being adapted to remove all slack from the system formed of said sections, computing elements, registering elements, and proportioning means, and to thereby determine by said system an optimal solution for said linear programming problem.

3. A computer as in claim 2 further comprising, means interconnecting the said K elements of at least two separate ones of said E sections to render said last-named K elements freely adjustable relative to each other in a manner whereby the adjustment of one is at least partially determined by the adjustment of the other.

4. A computer for linear programming problems wherein a number of variable quantities appear in simultaneous equations and also in a scoring equation, said computer comprising, a plurality of hydraulic sections respectively adapted to simulate said equations, a plurality of hydraulic cylinder and piston computing units disposed in each hydraulic section, and each adapted by the displacement of the piston thereof to simulate the value of a corresponding variable term in the equation simulated by the associated section, hydraulic piping interconnecting the cylinders of the respective computing units of each hydraulic section, said piping being adapted to transmit hydraulic fluid between the cylinders in its section, and to maintain constant the amount of fluid distributed among all the cylinders of each section corresponding to one of said simultaneous equations, a plurality of selectively positionable registering elements respectively corresponding to the computing units of all said sections, each registering element being adapted by its position to simulate the value of the variable quantity included within the variable term associated with the computing unit to which the registering element corresponds, a plurality of bidirectionally operable motion transmitting units each connected between one of said registering elements and the piston of the corresponding computing unit to translate displacements of the last-named piston into movements in position of the last-named registering elements and, the converse, each motion transmitting unit being adapted to provide different selected motion transmission ratios for motion transmitted therethrough, a plurality of linkages each coupling together all those registering elements which separately simulate the same one variable quantity, said last-named elements being linked together by their corresponding linkage to undergo the same amounts of movement in position, and a drive unit in the form of a hydraulic cylinder and piston of which the latter is freely movable and of which the former is connected to the hydraulic piping of the section simulating said scoring equation, said last-named piping enclosing a constant amount of hydraulic fluid distributed between said last-named cylinder and the cylinders of the computing units of said last-named section.

5. A computer as in claim 4 in which each piston of each computing unit is coupled to its corresponding motion transmitting unit by a stem having a rack thereon, the registering element associated with the last-named transmitting unit is a rod and is coupled to the transmitting unit by a rack thereon, and in which the said motion transmitting unit is an adjustable motion transmission ratio gear box which transmits motion between said stem and rod by gears including at least two pinions of which one and the other mesh, respectively, with the rack on the stem and the rack on the rod.

6. A computer as in claim 5 wherein the registering rod has a pointer thereon, and wherein a scale is disposed in proximity to the pointer to permit the latter to indicate values on the said scale.

7. A computer for linear programming problems wherein a number of variable quantities appear in respective variable terms of each of a lesser number of simultaneous equations which each also have a constant term, and wherein said variable quantities also appear in respective variable terms of a scoring equation which expresses by a scoring term the sum of the last-named variable terms, said computer comprising, a plurality of hydraulic sections E respectively representing said simultaneous equations, an additional hydraulic section S representing said scoring equation, a plurality of hydraulic cylinder and piston computing units A disposed in each E section in respective correspondence with the variable terms of the simultaneous equation associated therewith to simulate values of said last-named terms by proportional displacements of the respective pistons of said A computing units, a plurality of hydraulic cylinder and piston computing units B disposed in said S section in respective correspondence with the variable terms of said scoring equation to simulate values of said scoring equation variable terms by proportional displacements of the pistons of said B computing units, in each E section a hydraulic cylinder and piston computing unit K of which the piston is adjustable in position in the cylinder thereof, in said S section a hydraulic cylinder and piston computing unit Z of which the piston is freely movable in position in the cylinder thereof, hydraulic piping interconnecting the cylinders of the respective computing units of each of said E sections and of said S section, said piping being adapted to transmit hydraulic fluid between the cylinders in its section and to maintain constant the amount of fluid distributed thereamong, a plurality of selectively positionable registering elements respectively corresponding to said A and B units, each element being adapted by its position to simulate the value of the variable quantity included within the variable term associated with the computing unit to which the registering element corresponds, a plurality of bidirectionally operable motion transmitting units each connected between one of said registering elements and the piston of the corresponding computing unit to translate displacements of the last-named piston into movements in position of the last-named registering element and the converse, each motion transmitting unit being adapted to provide different selected motion transmission ratios for motion transmitted therethrough, and a plurality of linkages each coupling together all those registering elements which separately simulate the same one variable quantity, said last-named elements being linked together by their corresponding linkages to undergo the same amounts of movement in position.

8. A computer as in claim 7 further comprising a linkage interconnecting the pistons of the said K computing units of at least two separate ones of said E sections to render said last-named pistons freely adjustable in displacement relative to each other in a manner whereby the adjustment in displacement of at least one of said last-named pistons is at least partially determined by the adjustment in displacement of the other.

9. A computer for linear programming problems wherein a number of variable quantities appear in respective variable terms of each of a lesser number of simultaneous equations which each also have a constant term, and wherein said variable quantities also appear in respective variable terms of a scoring equation which expresses by a scoring term the sum of the last-named variable terms, said computer comprising, a plurality of hydraulic sections E respectively representing said simultaneous equations, an additional hydraulic section S representing said scoring equation, a plurality of hydraulic cylinder and piston computing units A disposed in each E section in respective correspondence with the variable terms of the simultaneous equation associated therewith to simulate values of said last-named terms by proportional displacements of the respective pistons of said A computing units, a plurality of hydraulic cylinder and piston computing units B disposed in said S section in respective correspondence with the variable terms of said scoring equation to simulate values of said variable terms of said scoring equation by proportional displacements of the pistons of said B computing units, in each E section a hydraulic cylinder and piston computing unit K of which the piston is adjustable in position in the cylinder thereof, in said S section a hydraulic cylinder and piston computing unit Z of which the piston is freely movable in the cylinder thereof, hydraulic piping interconnecting the cylinders of the respective computing units in each of said E sections and in said S section, said piping being adapted to transmit hydraulic fluid between the cylinders in its section and to maintain constant the amount of fluid distributed thereamong, a plurality of stems respectively connected to the pistons of said A and B units, each stem having a rack thereon, a plurality of selectively positionable rods each having a rack thereon and respectively corresponding to said A and B units, each rod being adapted by its position to simulate the value of the variable quantity included within the variable term associated with the computing element to which the rod corresponds, a plurality of bidirectionally operable gear boxes respectively coupling each rod and the stem for the piston of the corresponding computing unit to transmit motion between one and the other, each gear box having at least two pinions which mesh, respectively, with the separate racks on, respectively, the associated rod and associated stem, and each gear box being adapted to provide a selectively adjustable motion transmission ratio between the said rod and stem, and a plurality of linkages each coupling together all those rods which separately simulate the same one variable quantity, said last-named rods being linked together by their corresponding linkage to undergo the same amounts of movement in position.

References Cited in the file of this patent

UNITED STATES PATENTS 2,476,747 Lovell ------------------ July 19, 1949

OTHER REFERENCES

The Theory of Mathematical Machines by F. J. Murray, King's Crown Press, New York (pages III-1 to III-3 and III-13 to III-20 is of particular interest).